United States Patent
Liu et al.

(10) Patent No.: US 9,965,412 B2
(45) Date of Patent: May 8, 2018

(54) METHOD FOR APPLICATION-AWARE INTERRUPTS MANAGEMENT

(71) Applicant: SAMSUNG ELECTRONICS CO., LTD., Suwon-si, Gyeonggi-do (KR)

(72) Inventors: Fei Liu, Fremont, CA (US); Yang Seok Ki, Palo Alto, CA (US); Xiling Sun, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 222 days.

(21) Appl. No.: 14/970,293

(22) Filed: Dec. 15, 2015

(65) Prior Publication Data

US 2017/0103031 A1 Apr. 13, 2017

Related U.S. Application Data

(60) Provisional application No. 62/239,193, filed on Oct. 8, 2015.

(51) Int. Cl.
*G06F 13/24* (2006.01)
*G06F 13/22* (2006.01)
*G06F 13/40* (2006.01)

(52) U.S. Cl.
CPC .............. *G06F 13/24* (2013.01); *G06F 13/22* (2013.01); *G06F 13/4022* (2013.01)

(58) Field of Classification Search
CPC .......... G06F 13/22; G06F 13/24; G06F 13/32; G06F 3/06; G06F 3/60; G06F 9/48; G06F 9/50; G06F 13/4022
See application file for complete search history.

(56) References Cited

U.S. PATENT DOCUMENTS

| | | | |
|---|---|---|---|
| 6,418,517 B1 | 7/2002 | McKenney et al. | |
| 6,754,738 B2 | 6/2004 | Brice, Jr. et al. | |
| 7,149,832 B2 | 12/2006 | Wieland et al. | |
| 7,178,145 B2 | 2/2007 | Bono | |
| 7,610,413 B2 | 10/2009 | Pope et al. | |
| 7,788,435 B2 * | 8/2010 | Worthington | G06F 9/4812 710/263 |
| 8,180,973 B1 | 5/2012 | Armangau et al. | |
| 8,640,140 B2 | 1/2014 | Waddington et al. | |
| 2008/0155571 A1 | 6/2008 | Kenan et al. | |
| 2009/0217369 A1 | 8/2009 | Abeni et al. | |
| 2011/0087814 A1 * | 4/2011 | Liu | G06F 13/24 710/260 |
| 2012/0017213 A1 * | 1/2012 | Hunt | G06F 21/53 718/100 |
| 2013/0024875 A1 | 1/2013 | Wang et al. | |
| 2014/0195708 A1 | 7/2014 | Klein et al. | |
| 2015/0026398 A1 * | 1/2015 | Kim | G06F 13/102 711/105 |
| 2015/0331720 A1 * | 11/2015 | Huetter | G06F 9/544 718/104 |
| 2016/0259693 A1 * | 9/2016 | Sundararaman | G06F 11/1458 |

* cited by examiner

*Primary Examiner* — Steven Snyder
*Assistant Examiner* — Christopher A Daley
(74) *Attorney, Agent, or Firm* — Innovation Counsel, LLP

(57) ABSTRACT

According to one embodiment, a computer system includes a host computer, and a storage device coupled to the host computer. The host computer has a user-space device driver of the storage device in a user space of a host operating system (OS). The user-space device driver is configured to handle I/O operations to and from the storage device based on an application running on the host computer.

20 Claims, 7 Drawing Sheets

METHOD FOR APPLICATION-AWARE INTERRUPTS MANAGEMENT

CROSS-REFERENCE TO RELATED APPLICATION(S)

This application claims the benefit of and priority to U.S. Provisional Patent Application Ser. No. 62/239,193 filed Oct. 8, 2015, the disclosure of which is incorporated herein by reference in its entirety.

TECHNICAL FIELD

The present disclosure relates generally to memory systems for computers and, more particularly, to a method for providing application-aware interrupts management.

BACKGROUND

A relational database organizes data based on a relational model of data. Most relational database systems use structured query language (SQL) for querying and maintaining a relational database. On the other hand, a non SQL (NoSQL) database refers to another type of database that does not store and retrieve data using tabular relations used in relational databases. A key-value (KV) database is an example of NoSQL databases that store an associative array (e.g., a map, a dictionary) to represent data as a collection of key-value pairs.

NoSQL databases have found significant and growing industry use in big data and real-time web applications that require high throughput and I/O performance. Due to their improved performance and dynamic scalability, data storage devices implementing a KV database, also referred to as KV devices, are adequate for big data and real time applications. In order to take advantage of the improved performance and dynamic scalability of KV devices, a host computer should be properly configured to optimize the performance of KV devices. High performance database applications may require a complex input/output (I/O) mechanism to and from data storage devices, for example, message signaled interrupts (MSI) and CPU affinity.

SUMMARY

The present disclosure provides a system and method for providing an efficient interrupt handling for a high performance storage device. According to one embodiment, a computer system includes a host computer, and a storage device coupled to the host computer. The host computer has a user-space device driver of the storage device in a user space of a host operating system (OS). The user-space device driver is configured to handle I/O operations to and from the storage device based on an application running on the host computer.

According to another embodiment, a method for providing an interrupt handling includes: providing a user-space device driver for a storage device coupled to a host computer in a user space of a host operating system of the host computer; and configuring the user-space device driver to handle I/O operations to and from the storage device based on an application running on the host computer.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
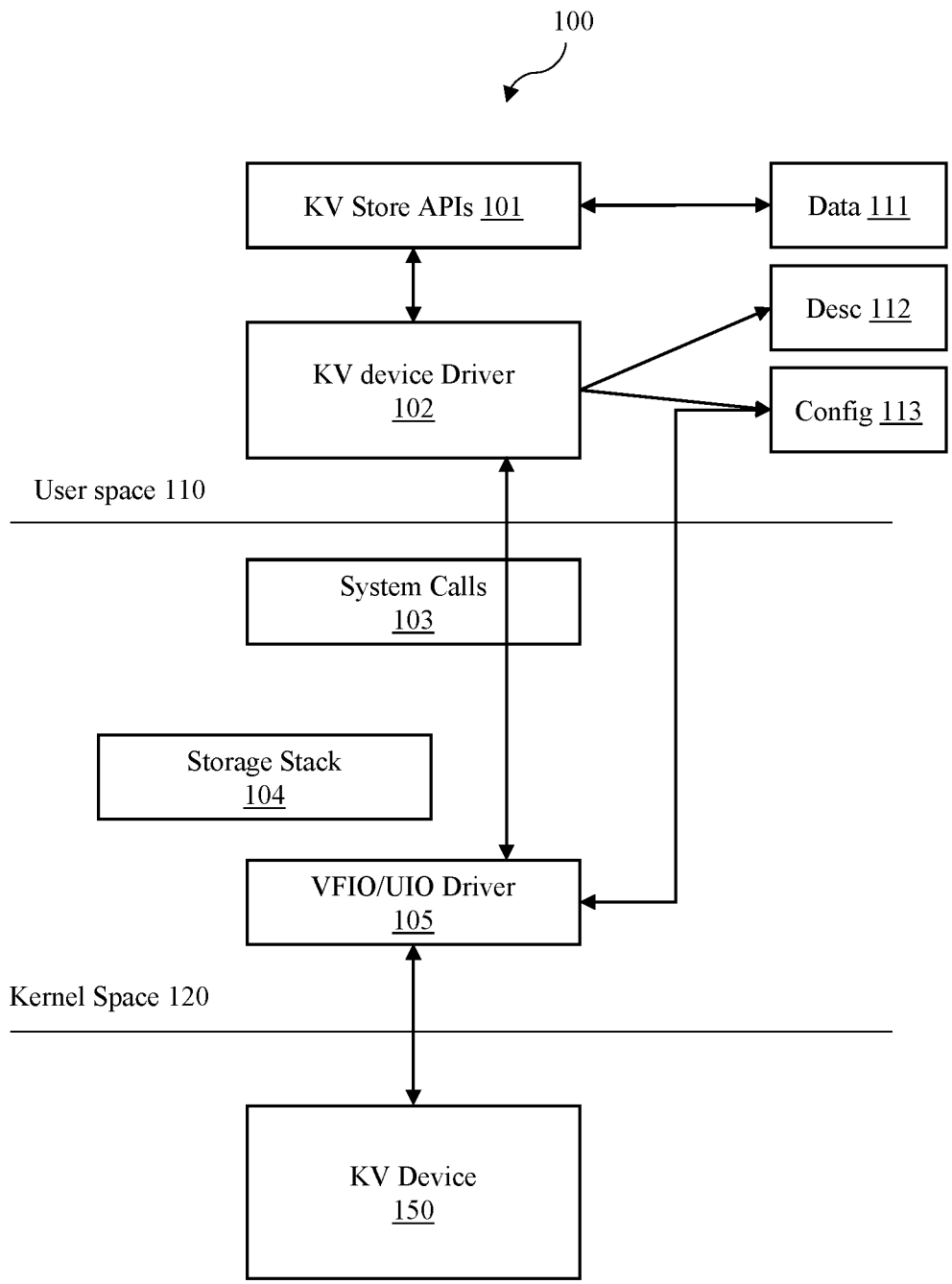
FIG. 1 shows an architecture of an example database system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a method for providing application-aware interrupts management. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help understand how the present teachings are practiced, but not intended to limit the dimensions and the shapes shown in the examples.

Traditionally, an interrupt line (or pin) has been used to assert an interrupt signal to a host processor. This form of interrupt signaling, also referred to as an out-of-band form of control signaling, requires a dedicated interrupt line or pin. As opposed to the out-of-band interrupt signaling, message signaled interrupt (MSI) as defined in PCI 2.2 and MSI-x defined in PCI 3.0 (herein collectively referred to as MSI) is an in-band form of signaling an interrupt. MSI uses special in-band messages to replace out-of-band assertions on a dedicated interrupt line. For example, peripheral component interconnect (PCI) express (PCI-e) does not have a separate interrupt line but instead uses special in-band messages to assert an interrupt.

MSI have significant advantages over pin-based out-of-band interrupt signaling. On a mechanical side, a simpler, cheaper, and more reliable connector can be made with no pins. MSI can also increase the number of interrupts while traditional out-of-band interrupts are limited to the number of physical interrupt pins. Further, a pin-based interrupt can cause a race condition with a write operation to a memory device because an interrupt could arrive before the memory write operation is completed. To prevent a race condition, an interrupt handler is required to read from the memory device to ensure the completion of the memory write operation. To the contrary, an MSI write cannot pass a DMA write, thus eliminating such a race condition.

CPU affinity (also referred to as processor affinity) enables binding and unbinding of a process or a thread of an application to a central processing unit (CPU) or a group of CPUs to allow the process or thread to execute on a designated CPU or CPUs. CPU affinity can take advantage of remnants of a process that may exist on a particular CPU, for example, data remaining in the CPU cache. Scheduling that a particular process or thread continues to execute on the same processor can improve the efficiency and reduce performance-degrading situations such as cache misses. An example of CPU affinity is a graphics-rendering application that executes multiple instances at a time.

The present disclosure provides a device driver of a key-value (KV) device implemented in a user space of a host computer. The KV device can include a non-volatile storage such as a flash memory, a phase-change memory (PCM), a spin-transfer torque magnetic RAM (STT-MRAM), and the like. The host computer can have one or more CPUs arranged in one or more sockets, and each CPU can have one or more CPU cores. The host computer can perform I/O operations to access (e.g., read, write, modify) data stored in the KV device synchronously or asynchronously. In one embodiment, the host computer can communicate with the KV device via I/O queues and message signaled interrupts (MSIs). The message responses from the KV device can contain interrupts. The device driver of the KV device can efficiently handle the message responses from the KV device to increase the input/output (I/O) performance in terms of latency and I/O operations per second (IOPS) for the KV device.

The operating system of the host computer can segregate a virtual memory of the host computer into a kernel space and a user space. The separation between the kernel space and the user space provides memory protection from faults. The kernel space is typically reserved for running an operating system kernel, kernel extensions, and most device drivers. In contrast, the user space provides a memory area where application software, programs, and libraries that the operating system uses can be held. The user space can also include certain device drivers. The user space can interact with the kernel space as the application programs perform I/O, and the operating system manipulates the file system of the host computer. Each process normally runs in its own virtual memory space (i.e., user space), and, unless explicitly allowed, cannot access the memory of other processes.

According to one embodiment, the host computer can include a KV device driver in the user space to achieve high throughput and improve performance. The KV device can include various types of memories that are optimized specifically for the KV device. For example, the KV device can include a flash memory that is optimized for the KV device. The KV device driver can achieve high throughput and performance improvement by implementing various performance features, for example, multi-level CPU affinity, multi-level completion coalescing, and switching completion handling from interrupt to polling, as will be described below in further detail. The KV device driver can be loaded during the booting-up of the host computer, or a launch of an application program in the user space of the host operating system after the host computer has been booted up.

The host computer can include multi-core CPUs and one or more KV devices. According to one embodiment, the KV device driver for the KV device(s) can be implemented in the user space of the host computer operating system. The KV device driver can handle the responses from the KV device differently based on a target application running on the host computer. In one embodiment, the KV device driver can provide two-level CPU affinity. The KV device driver can set up a message signaled interrupt (MSI) entry with CPU affinity for each interrupt message handler. The target application running in the user space can set or modify the CPU affinity based on a queue of an issued I/O command.

FIG. 1 shows an architecture of an example database system, according to one embodiment. The operating system of the system 100 has a KV store API 101 and a KV device driver 102 in a user space 110, and a kernel in a kernel space 120. The KV store API 101 provides an application programming interface (API) for a KV device 150. The KV device 150 can include a non-volatile memory such as flash memory. The KV device driver 102 is a device driver for the KV device 150. The system 100 also has storage for data 111, description 112, and configuration information 113 for interrupt management and handling such as CPU affinity, interrupt coalescing, and interrupt mode switching. In the kernel space 120 of the operating system, the kernel has system calls 103, a storage stack 104, and a virtual function I/O (VFIO) driver and a user space I/O (UIO) driver 105. The VFIO/UIO driver 105 handles I/O operations between the KV device 150 and the KV device driver 102 in the user space 110.

In cases where each read or write completion from the KV device 150 would trigger an interrupt to a host computer, the host computer could be busy dealing with interrupts. To provide efficient interrupt handling and management, the present system 100 can provide the KV device driver for the KV device 150 in a user space of the host operating system to improve the I/O performance.

When a device interrupt happens, the device interrupt is usually delivered to a processor (or CPU) in the system in a round robin scheme. Accordingly, there is a chance that the device interrupt can be delivered to another processor when the original processor still runs a target application. This situation creates a cache-thrashing situation resulting in inter-processor locking and inter-processor interrupts between an interrupt-delivered CPU and an interrupt-target CPU. Frequent occurrence of cache thrashing plays a significant influence on the I/O performance of the system. To mitigate cache-thrashing situations, the present KV device driver provides multi-layer (e.g., two-layer) CPU affinity to increase the system's I/O performance.

Figure 2:
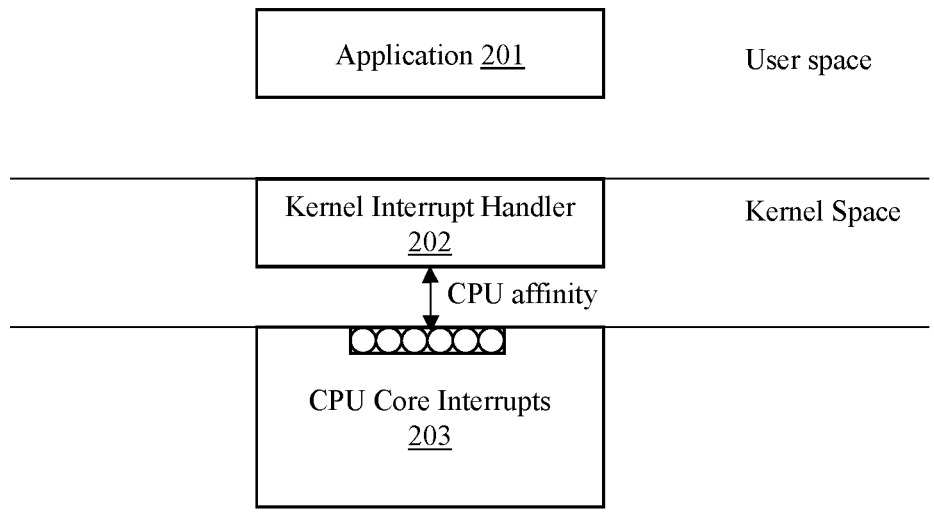
FIG. 2 shows a conventional example of CPU affinity.

FIG. 2 shows a conventional example of CPU affinity. The host computer can include a kernel interrupt handler 202 that provides CPU affinity for CPU core interrupts 203. The CPU core interrupts 203 can be issued at a device level. The CPU affinity between a KV device and a host computer is established at a kernel level. The kernel of the host computer can process the CPU core interrupts 203 in bulk. Accordingly, an application 201 (or a thread of the application 201) running on the host computer may not be guaranteed to bind a particular interrupt 203 to a dedicated CPU of the host computer because the kernel interrupt handler 202 does not have the associative information between the application 201 and the device-level per CPU core interrupts 203. As a result, the conventional CPU affinity can create an undesirable cache-thrashing situation such as an inter-processor locking and inter-processor interrupts between an interrupt-delivered CPU and an interrupt-target CPU.

Figure 3:
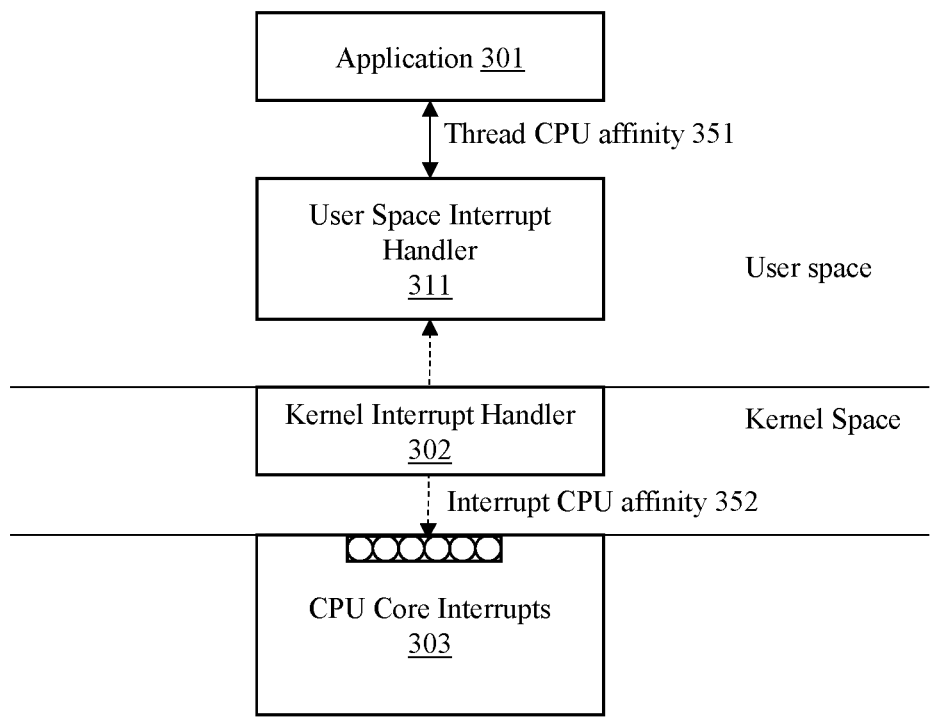
FIG. 3 shows an example of two-layer CPU affinity, according to one embodiment.

According to one embodiment, the present disclosure provides two layers of CPU affinity. FIG. 3 shows an example of two-layer CPU affinity, according to one embodiment. The user-space interrupt handler 311 of a host computer establishes the two-layer CPU affinity between a thread of the application 301 and a dedicated CPU core of the host computer. In one embodiment, the present KV device driver can include the user-space interrupt handler 311. The two-layer CPU affinity includes an application thread CPU affinity 351 established in a user space and an interrupt CPU affinity 352 established in a kernel space. The kernel interrupt handler 302 is similar to the kernel interrupt handler 202 of FIG. 2 in that it provides a bare bones interrupt handling capability, i.e., the exchange of I/O queues and interrupt messages 303 between the KV device and the host computer. The application thread CPU affinity 351 can guarantee that each application 301 (or a thread of the application 301) running on a host computer binds to a dedicated CPU core. The application 301 may issue sufficient I/O operations to saturate I/O operations of a high-speed SSD device. In this case, the interrupt CPU affinity 352 can guarantee that the interrupt is delivered to a target CPU core for a particular I/O operation. Although the present example shows two-layer CPU affinity, it is understood that different number of layers of CPU affinity can be implemented without deviating from the scope of the present disclosure.

Figure 4:
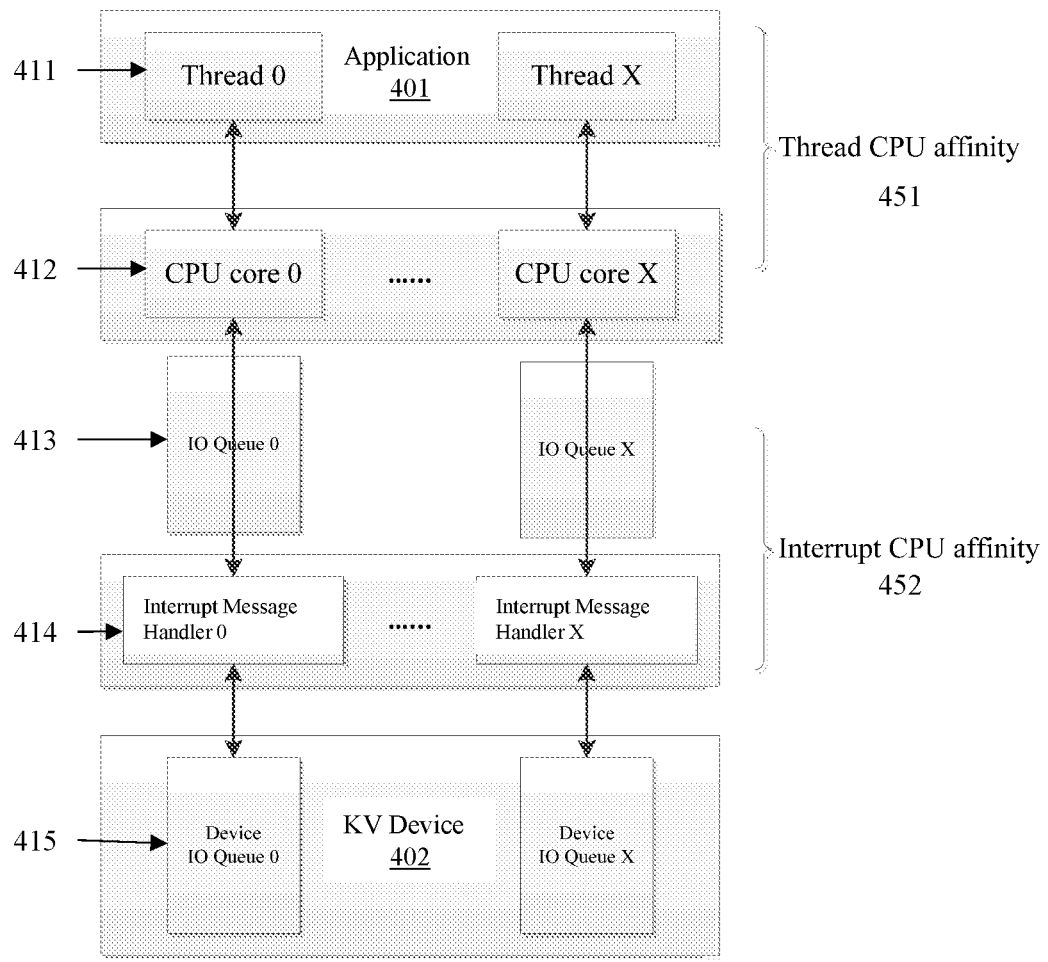
FIG. 4 shows a workflow for an example CPU layer affinity, according to one embodiment.

FIG. 4 shows a workflow for an example CPU layer affinity, according to one embodiment. Initially, a user-space interrupt handler (e.g., user-space interrupt handler 311 of FIG. 3) of the host computer establishes thread CPU affinity 451 for a thread 411 of an application 401 with a CPU core 412 of the host computer by assigning a binding between the thread 411 with the CPU core 412. The binding information of the CPU affinity 451 between the thread 411 and the CPU core 412 can be stored in a memory (not shown) of the user-space interrupt handler. The user-space interrupt handler issues an I/O queue 413 associated with the thread CPU affinity 451 and further establishes an interrupt CPU affinity 452 between the I/O queue 413 and an interrupt message handler 414. The interrupt message handler 414 sends an interrupt message to a coupled KV device 402.

The interrupt message from the host computer to the KV device 402 includes the interrupt CPU affinity information. Using the interrupt CPU affinity information received from the host computer, the KV device 402 can send an interrupt message to the dedicated interrupt message handler 414 at runtime. The interrupt message received by the interrupt message handler 414 can be delivered to the associated CPU core 412 for the target thread 411 by the two-layer CPU affinity, i.e., interrupt CPU affinity 452 implemented by the interrupt message handler 414 and the thread CPU affinity 401 implemented by the user space interrupt handler.

Each I/O queue 413 issued by the application 401 is associated with a dedicated interrupt message handler 414. The dedicated interrupt message handler 414 can have the identification information of the I/O queue 413 with its paired CPU core 412 of the host computer. Once an interrupt is issued from the KV device 402, the host computer can efficiently find a target CPU core 412 by recognizing the CPU's interrupt vector. Since each thread 411 of the application 401 is associated with a CPU core 412 via the thread CPU affinity 451 and a dedicated interrupt message handler 414 via the interrupt CPU affinity 452, the host computer can handle the interrupts issued by the KV device 420 specifically aimed at a target application 401.

Figure 5:
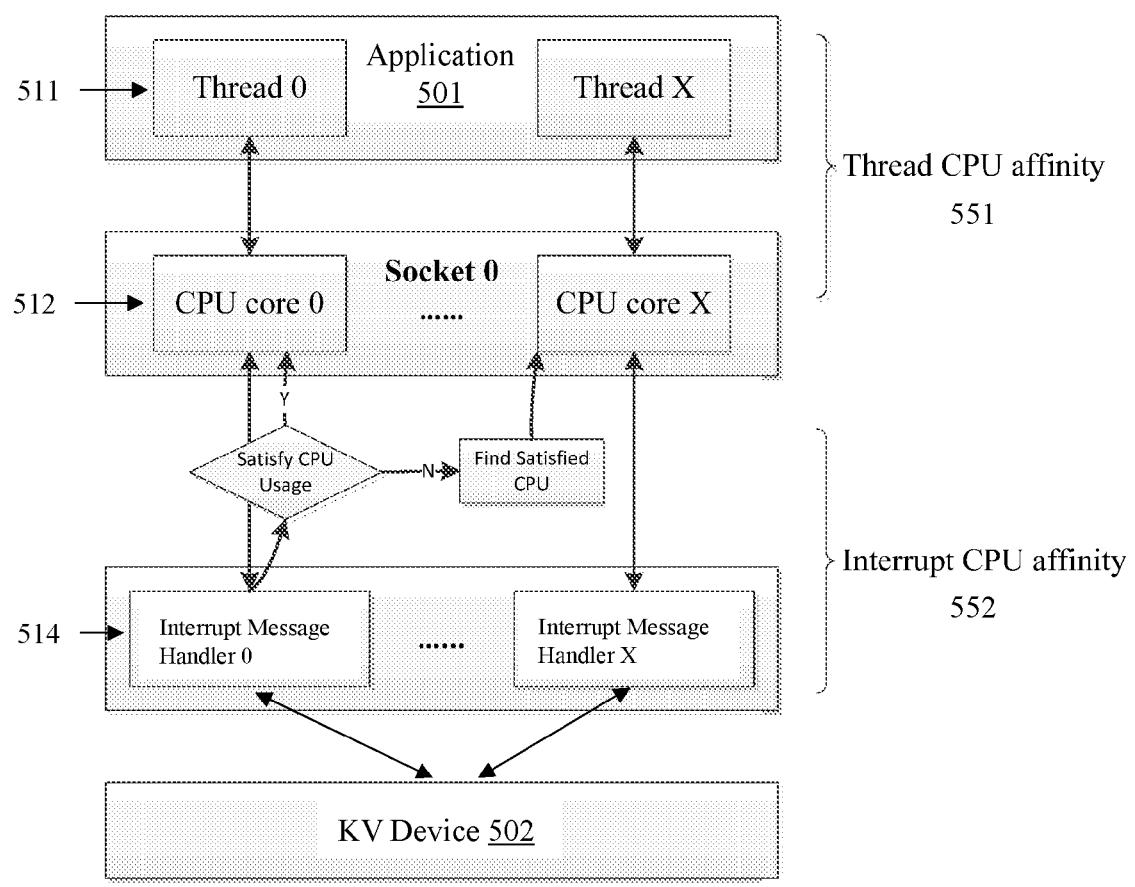
FIG. 5 shows a workflow of an example interrupt load control, according to one embodiment.

FIG. 5 shows a workflow of an example interrupt load control, according to one embodiment. When the KV device driver of the host computer determines that the usage of a target CPU core 512 coupled to a KV device 502 is too high to process further interrupts from the KV device 502, the KV device driver can control an interrupt load among the CPUs of the host computer in order to improve the I/O performance. For example, the KV device driver attempts to find another CPU core with a lower CPU usage within the same socket where the target CPU core 512 is located. In one embodiment, CPU cores inside the same socket can share L2 or L3 cache while CPU cores in different sockets communicate via memory or with cache-to-cache interactions using a cache coherency protocol. Therefore, inter CPU communication inside the same socket can be faster than CPU communication between CPU cores in different sockets. When the KV device driver determines that the candidate CPU cores located inside the same socket are also busy to receive further interrupts, the KV device driver attempts to find a CPU with a lower CPU usage located in a different socket.

Interrupt coalescing or completion coalescing refers to a technique in which I/O events that would normally trigger an interrupt are delayed, either until a certain amount of work is pending, or a timeout timer triggers. Interrupt coalescing can reduce an interrupt workload while only incurring a relatively small latency penalty.

According to one embodiment, the present KV device driver provides multi-level interrupt coalescing. For example, the multi-level interrupt coalescing is two-level. Once the completions are coalesced at a first level, the present KV device driver can also perform a second level coalescing. The completions can be pulled from the KV device completion queue and put into the completion queue of the application. The second level completion queue can also have a coalescing feature. The value of the coalescing threshold can be adjusted based on the application workload.

Figure 6:
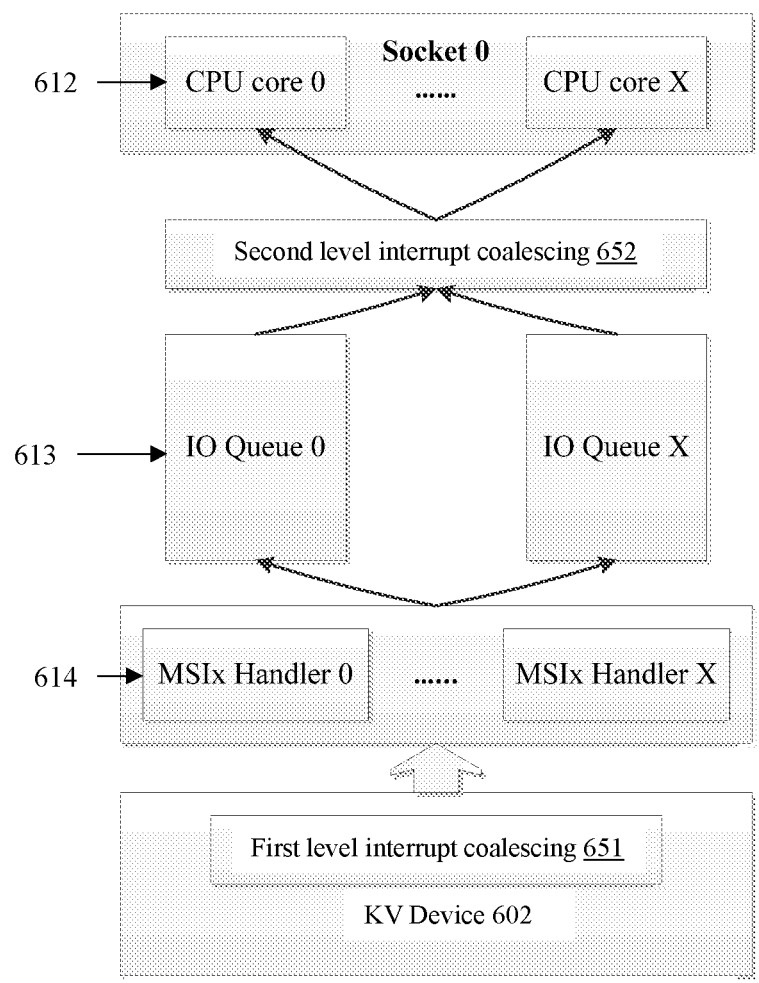
FIG. 6 shows an example of two level completion coalescing, according to one embodiment.

FIG. 6 shows an example of two level completion coalescing, according to one embodiment. In one embodiment, the two level completion coalescing includes a first device level coalescing and a second level coalescing in a device driver level on a host computer. The first device level coalescing 651 is performed at a device level within the KV device 602. The KV device 602 issues an interrupt message to a coupled interrupt message handler 614 based on the first device level coalescing 651. In addition to the first device level coalescing 651, the present KV device driver of the host computer can perform the second level coalescing 652 at a device driver level of the host computer. The two level completion coalescing allows the KV device driver to utilize an interrupt message received from the KV device 602 to interrupt coalescing in a user space as well. The capability of interrupt coalescing in the user space can provide more flexible interrupt coalescing on the driver side based on the application, thus enabling an application-aware interrupt management and handling. Referring also to FIG. 1, the present system has the KV device driver 102 for the KV device 150 on the host side in the user space 110 instead of in the kernel space 120. Because the KV device driver 102 is located in the user space 110, the KV device driver can implement more flexible interrupt coalescing on the driver side.

Interrupt messages generated by the KV device 602 targeting a specific CPU core 612 are first sent to the coupled interrupt message handlers 614 via the first level interrupt coalescing 651. The interrupt messages are stored in a completion queue (not shown) of the interrupt message handlers 614. In one example, the completion queue is shared among the interrupt message handlers 614. In another example, each of the interrupt message handlers 614 has its own completion queue. The interrupt message handlers 614 process the interrupt messages in the completion queue(s) in a batch at a time based on a predetermined interval, and generate I/O queues 613.

In one embodiment, the KV device driver 102 performs the second layer interrupt coalescing 652 with a host-side aggregation time and an aggregation threshold in the user space. The KV device driver 102 can dynamically adjust these two values, i.e., the host-side aggregation time and an aggregation threshold, based on the application workload. Once entering a call back function, the KV device driver 102 can traverse the dedicated I/O completion queue to clear all the completed interrupt commands to fully utilize the interrupt interval.

According to one embodiment, the present KV device driver can switch completion handling using a mode changer between an interrupt mode and a polling mode, and vice versa. The mode changer can receive inputs from the host system such as IOPS, an I/O queue depth, and system latency, and switch the mode of operation based on the workload of the system. The polling mode is considered as a corner case of the interrupt mode. Completion handling by polling can consume excessive CPU resources, but can be useful for high IOPS workload. The present system provides a mechanism in a user space to dynamically switch the completion handler between the polling mode and the interrupt mode depending on the workload.

By default, the present KV device driver can use interrupts, i.e., in the interrupt mode, for completion handling with the two layers of CPU affinity and completion coalescing described above. When the interrupts exceeds a threshold of an interrupt load average, the present KV device driver can switch from the interrupt mode to the polling mode.

The present KV device driver can periodically monitor the interrupt load both locally and globally. For example, the local interrupt load can be computed every second, and the global load average can be calculated every minute, i.e., averaging 60 samples. The local interrupt load average can be used to determine if a particular CPU core has a large number pending interrupts. The global interrupt load average can be used to determine if the system as a whole has a large number pending interrupts.

According to one embodiment, the configuration for completion handling can be set to switch globally or locally. When running in the polling mode, the present KV device driver can switch back to the interrupt mode if the interrupt load average decreases below a threshold to save the CPU usage of the host computer. The present KV device driver can set a default threshold value and allow an application to have an option to set the threshold and/or set switching options, either globally or locally.

The following is an example of a pseudo-code for computing a rate threshold, according to one embodiment. A real time value of interrupt load average is calculated by the sum of the number of interrupts that are currently processing and the number of interrupts that are waiting to process divided by the number of interrupts that are currently processing. An interrupt load average is calculated by the average interrupt load average real time value for the past time window, for example, one minute.

Interrupt Load Average Real Time value=(number of interrupts currently processing+number of interrupts waiting to process)/(number of interrupts currently processing)

Interrupt Load Average=Average of Interrupt Load Average Real Time value for a predetermined time period.

The following is an example of a pseudo code for switching completion handling between the interrupt mode and the polling mode.

```
If (user input the bound of System_Metrics)
    METRICS_UPPER_BOUND and METRICS_LOWER_BOUND =
    User Input;
Else
    METRICS_UPPER_BOUND and METRICS_LOWER_BOUND =
DEFAULT_VALUES;
Monitor System_Metrics every INTERVAL second(s);
If (System_Metrics > METRICS_UPPER_BOUND and current policy
is Interrupt)
    Switch CPU core from Interrupt to Polling for high throughput;
If (System_Metrics < METRICS_LOWER_BOUND and current policy
is Polling)
    Switch CPU core from Polling to Interrupt for low latency;
```

Figure 7:
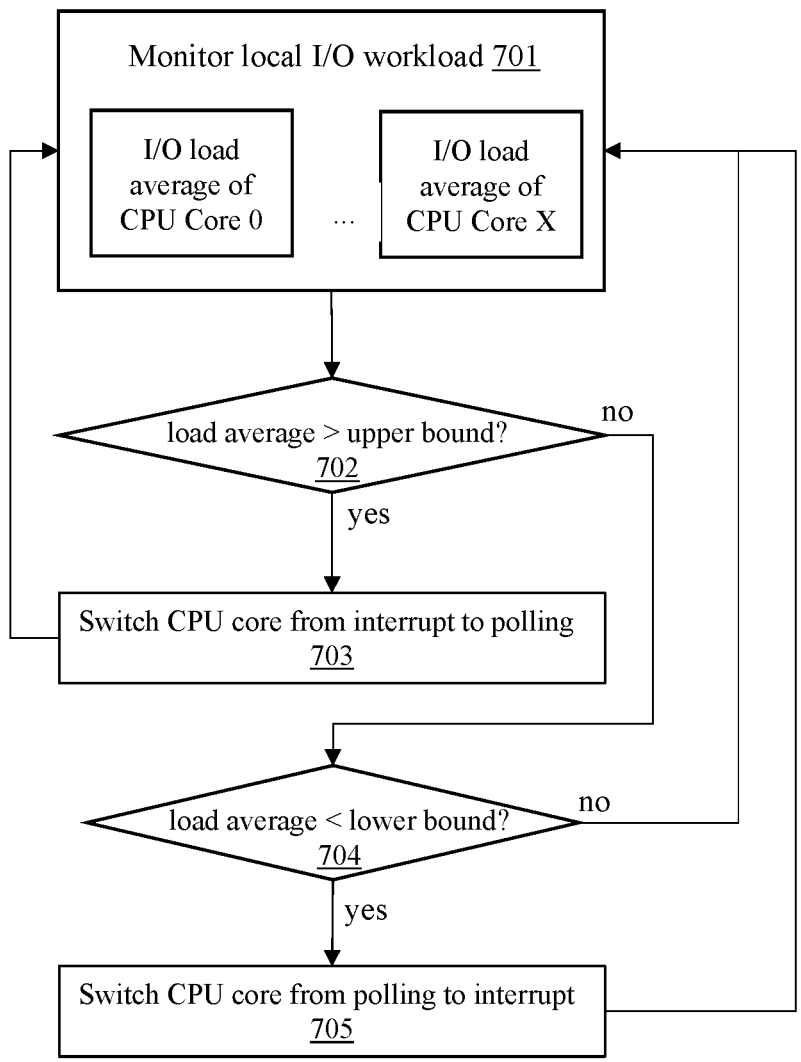
FIG. 7 shows an example of workflow for switching the completion handling between interrupt and polling locally.

FIG. 7 shows an example of workflow for local switching the completion handling between an interrupt mode and a polling mode. The present KV device driver in the user space can run in the interrupt mode by default (step 701). The KV device driver can monitor a local I/O workload of each of the CPU cores of the host computer. If any of the I/O workload is higher than a local threshold (or a local upper bound workload, step 702, the KV device driver can switch the CPU core from the interrupt mode to the polling mode to achieve high throughput (step 703). The KV device driver continues to monitor the I/O workload. When the KV device driver determines that the I/O workload is lower than the local threshold (or a local lower bound workload, step 704), the KV device driver can switch the CPU core from the polling mode to the interrupt mode to reduce latency (step 705).

Figure 8:
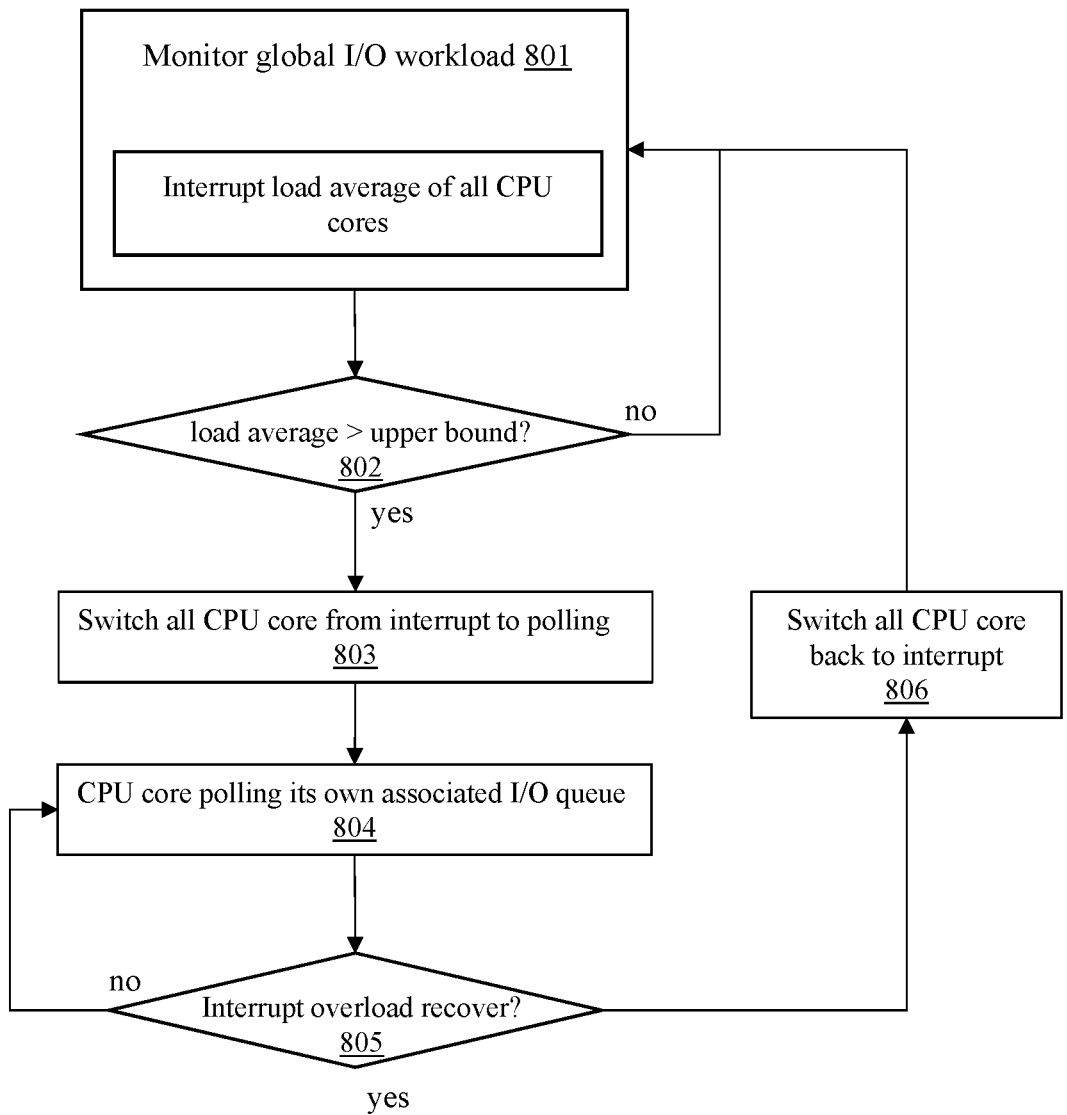
FIG. 8 shows an example of workflow for switching the completion handling between interrupt and polling globally.

FIG. 8 shows an example of workflow for switching the completion handling between interrupt and polling globally. The present KV device driver in the user space can run in the interrupt mode by default. The KV device driver can monitor an I/O workload of all CPU cores of the host computer globally (step 801). For example, the global workload is determined by an interrupt load average of all CPU cores. If the interrupt load average is higher than a global threshold (or a global upper bound workload, step 802), the KV device driver can switch all the CPU cores from the interrupt mode to the polling mode (step 803). After switching to the polling mode, each of the CPU core can poll its own associated I/O queues (step 804). The KV device driver continues to monitor the I/O workload. When the KV device driver determines that the interrupt overload is recovered (step 805), the KV device driver can switch the CPU core from the polling mode to the interrupt mode (step 806).

According to one embodiment, a computer system includes a host computer, and a storage device coupled to the host computer. The host computer has a user-space device driver of the storage device in a user space of a host operating system (OS). The user-space device driver is configured to handle I/O operations to and from the storage device based on an application running on the host computer.

The computer system can further include data storage, a description storage, and a configuration storage. The storage device can be a key-value (KV) device, and the user-space device driver can be a KV device driver configured to run in the user space.

The computer system can further include a plurality of central processing unit (CPU) cores. The user-space device driver can include a user-space interrupt handler that is configured to provide a thread CPU affinity between a thread of an application running in the user space and a first CPU core.

The host operating system can further include a kernel interrupt handler that is configured to provide an interrupt CPU affinity between an I/O queue and an interrupt message handler.

The user-space device driver can be configured to receive an interrupt from the KV device and identify that the interrupt is dedicated to the thread of the application running in the user space and the first CPU core via the interrupt CPU affinity and the thread CPU affinity. The user-space device driver can be configured to switch the interrupt to a second CPU core in a same socket as the first CPU core. The user-space device driver can be configured to provide a first level interrupt coalescing in the storage device and a second level interrupt coalescing between the first CPU core and the I/O queue in the user space.

The user-space device driver can be configured to switch a mode of interrupt handling between an interrupt mode and a polling mode. The user-space device driver can be configured to monitor a local workload of a CPU core and switch the mode of interrupt handling based on the local workload of the CPU core. The user-space device driver can be configured to monitor a global workload of a plurality of CPU cores and switch the mode of interrupt handling based on the global workload of the plurality of CPU cores.

According to another embodiment, a method for providing an interrupt handling includes: providing a user-space device driver for a storage device coupled to a host computer in a user space of a host operating system of the host computer; and configuring the user-space device driver to handle I/O operations to and from the storage device based on an application running on the host computer.

The storage device can be a key-value (KV) device, and the user-space device driver can be a KV device driver configured to run in the user space.

The host computer can include a plurality of central processing unit (CPU) cores. The method can further include: configuring a user-space interrupt handler of the user-space device driver and providing a thread CPU affinity between a thread of an application running in the user space and a first CPU core; and The method can further include: configuring a kernel interrupt handler of the host operating system and providing an interrupt CPU affinity between an I/O queue and an interrupt message handler.

The method can further include receiving an interrupt from the KV device and identifying that the interrupt is dedicated to the thread of the application running in the user space and the first CPU core via the interrupt CPU affinity and the thread CPU affinity. The method can further include switching the interrupt to a second CPU core in a same socket as the first CPU core.

The method can further include providing a first level interrupt coalescing in the storage device and a second level interrupt coalescing between the first CPU core and the I/O queue in the user space.

The method can further include switching a mode of interrupt handling between an interrupt mode and a polling mode. The method can further include monitoring a workload of one or more CPU cores and switching the mode of interrupt handling based on the workload of the one or more CPU cores.

The above example embodiments have been described hereinabove to illustrate various embodiments of implementing a system and method for dynamically scheduling memory operations for non-volatile memory. Various modifications and departures from the disclosed example embodiments will occur to those having ordinary skill in the art. The subject matter that is intended to be within the scope of the present disclosure is set forth in the following claims.

What is claimed is:

1. A computer system comprising:
a host computer comprising a plurality of central processing unit (CPU) cores; and
a storage device coupled to the host computer,
wherein the host computer has a user-space device driver of the storage device in a user space of a host operating system (OS), and
wherein the user-space device driver is configured to handle I/O operations to and from the storage device based on an application running on the host computer,
wherein the user-space device driver is configured to provide a first level interrupt coalescing in the storage device and a second level interrupt coalescing between the plurality of CPU cores and I/O queues in the user space.

2. The computer system of claim 1 further comprising: data storage, a description storage, and a configuration storage.

3. The computer system of claim 1, wherein the storage device is a key-value (KV) device, and the user-space device driver is a KV device driver configured to run in the user space.

4. The computer system of claim 1, wherein the user-space device driver comprise a user-space interrupt handler is configured to provide a thread CPU affinity between a thread of an application running in the user space and a first CPU core.

5. The computer system of claim 4, wherein the host operating system further comprises a kernel interrupt handler that is configured to provide an interrupt CPU affinity between an I/O queue and an interrupt message handler.

6. The computer system of claim 5, wherein the user-space device driver is configured to receive an interrupt from the KV device and identify that the interrupt is dedicated to the thread of the application running in the user space and the first CPU core via the interrupt CPU affinity and the thread CPU affinity.

7. The computer system of claim 6, wherein the user-space device driver is configured to switch the interrupt to a second CPU core in a same socket as the first CPU core.

8. The computer system of claim 1, wherein the storage device issues an interrupt message to an interrupt message handler among a plurality of interrupt message handlers based on the first level interrupt coalescing in the storage device and performs the second level interrupt coalescing at the user-space device driver.

9. The computer system of claim 1, wherein the user-space device driver is configured to switch a mode of interrupt handling between an interrupt mode and a polling mode.

10. The computer system of claim 9, wherein the user-space device driver is configured to monitor a local workload of a CPU core among the plurality of CPU cores and switch the mode of interrupt handling based on the local workload of the CPU core.

11. The computer system of claim 9, wherein the user-space device driver is configured to monitor a global workload of the plurality of CPU cores and switch the mode of interrupt handling based on the global workload of the plurality of CPU cores.

12. A method for providing interrupt handling comprising:
providing a user-space device driver for a storage device coupled to a host computer in a user space of a host operating system of the host computer; and
configuring the user-space device driver to handle I/O operations to and from the storage device based on an application running on the host computer,
wherein the host computer comprises a plurality of CPU cores, and
wherein the user-space device driver is configured to provide a first level interrupt coalescing in the storage device and a second level interrupt coalescing between the plurality of CPU cores and I/O queues in the user space.

13. The method of claim 12, wherein the storage device is a key-value (KV) device, and the user-space device driver is a KV device driver configured to run in the user space.

14. The method of claim 12 further comprising: configuring a user-space interrupt handler of the user-space device driver and providing a thread CPU affinity between a thread of an application running in the user space and a first CPU core.

15. The method of claim 14 further comprising: configuring a kernel interrupt handler of the host operating system and providing an interrupt CPU affinity between an I/O queue and an interrupt message handler.

16. The method of claim 15 further comprising receiving an interrupt from the KV device and identifying that the interrupt is dedicated to the thread of the application running in the user space and the first CPU core via the interrupt CPU affinity and the thread CPU affinity.

17. The method of claim 16 further comprising switching the interrupt to a second CPU core in a same socket as the first CPU core.

18. The method of claim 12 further comprising issuing an interrupt message to an interrupt message handler among a plurality of interrupt message handlers based on the first level interrupt coalescing in the storage device and performing the second level interrupt coalescing at the user-space driver.

19. The method of claim 15 further comprising switching a mode of interrupt handling between an interrupt mode and a polling mode.

20. The method of claim 19 further comprising monitoring a workload of the plurality of CPU cores and switching the mode of interrupt handling based on the workload of the plurality of CPU cores.

* * * * *